C. J. ARNOLD.
WIRELESS CORN PLANTER.
APPLICATION FILED OCT. 3, 1919.
1,420,465.
Patented June 20, 1922.
4 SHEETS—SHEET 3.
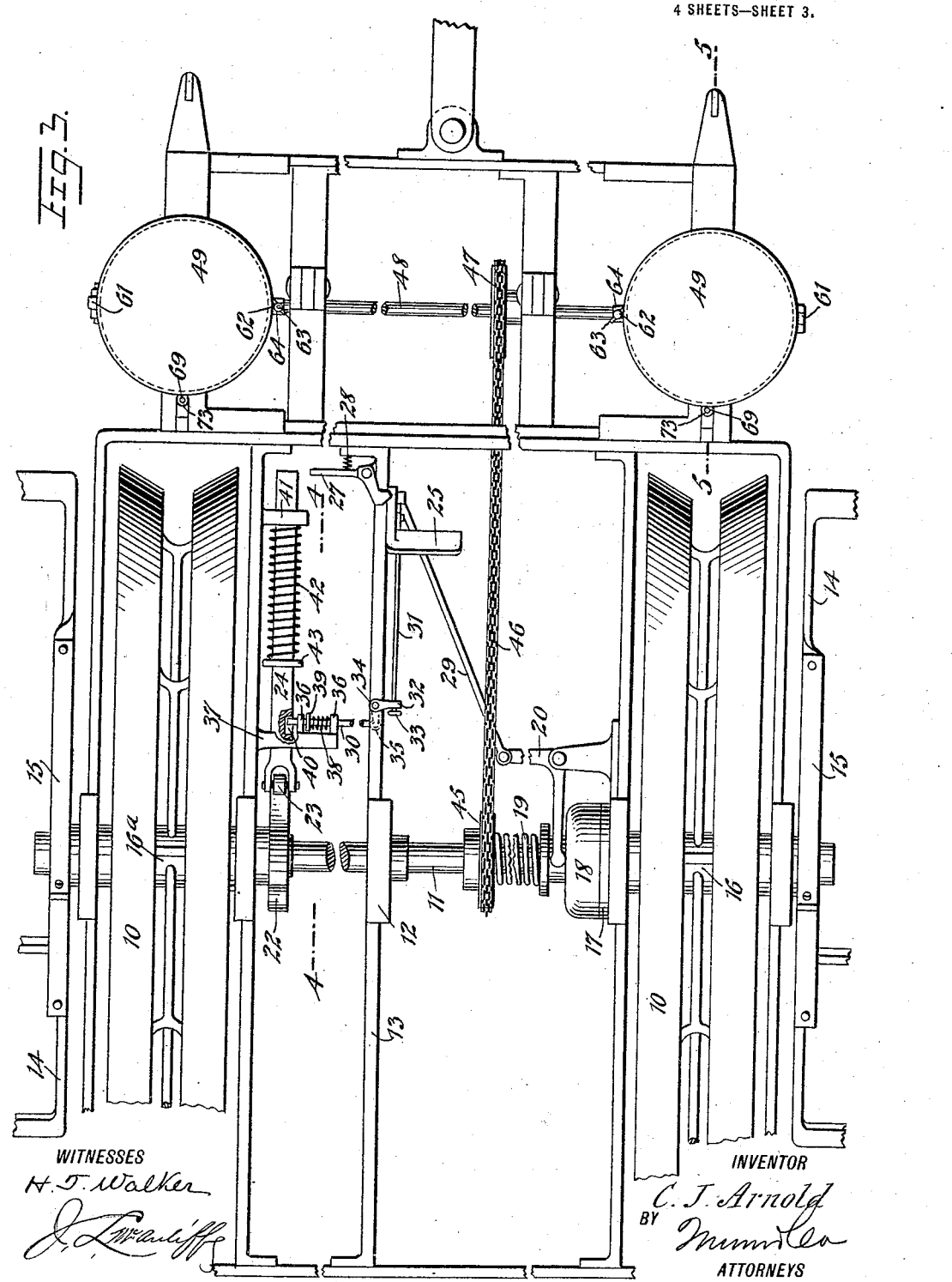
WITNESSES
INVENTOR
C. J. Arnold
BY
ATTORNEYS C. J. ARNOLD.
WIRELESS CORN PLANTER.
APPLICATION FILED OCT. 3, 1919.
1,420,465.
Patented June 20, 1922.
4 SHEETS—SHEET 4.
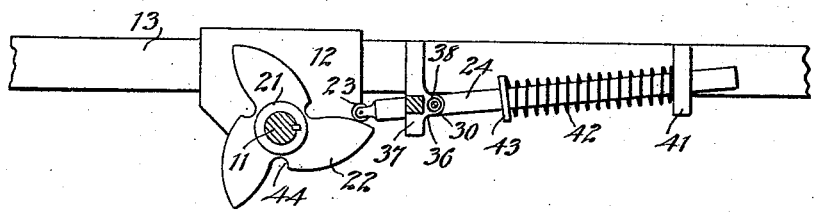
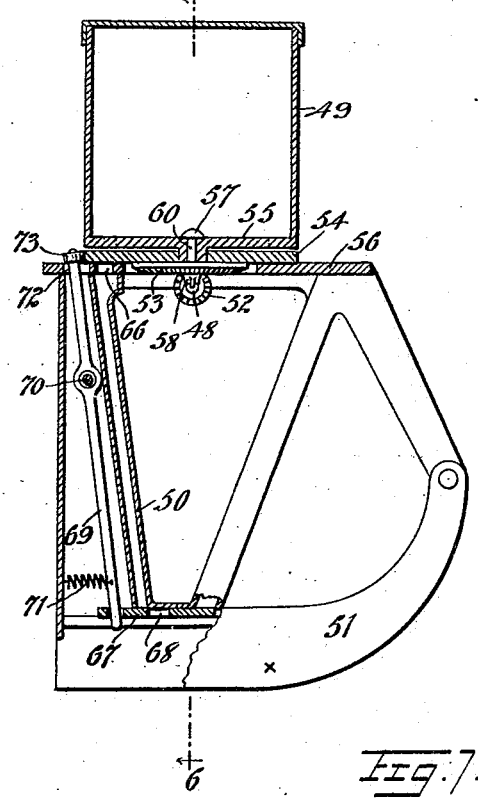
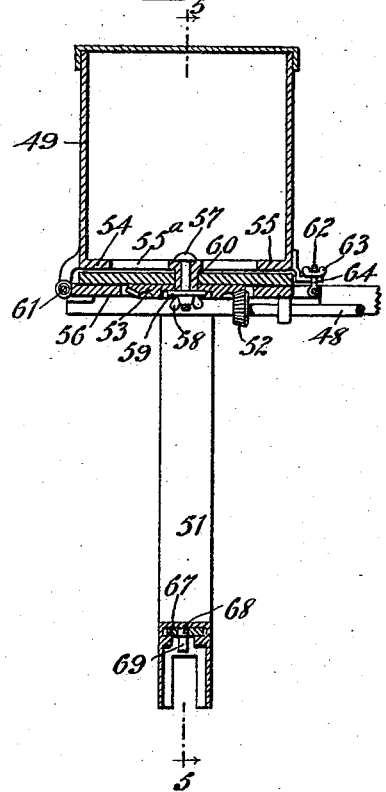
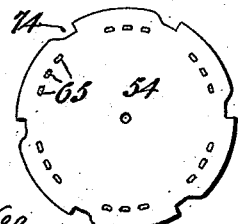
WITNESSES
INVENTOR
Christian J. Arnold
BY
ATTORNEYS

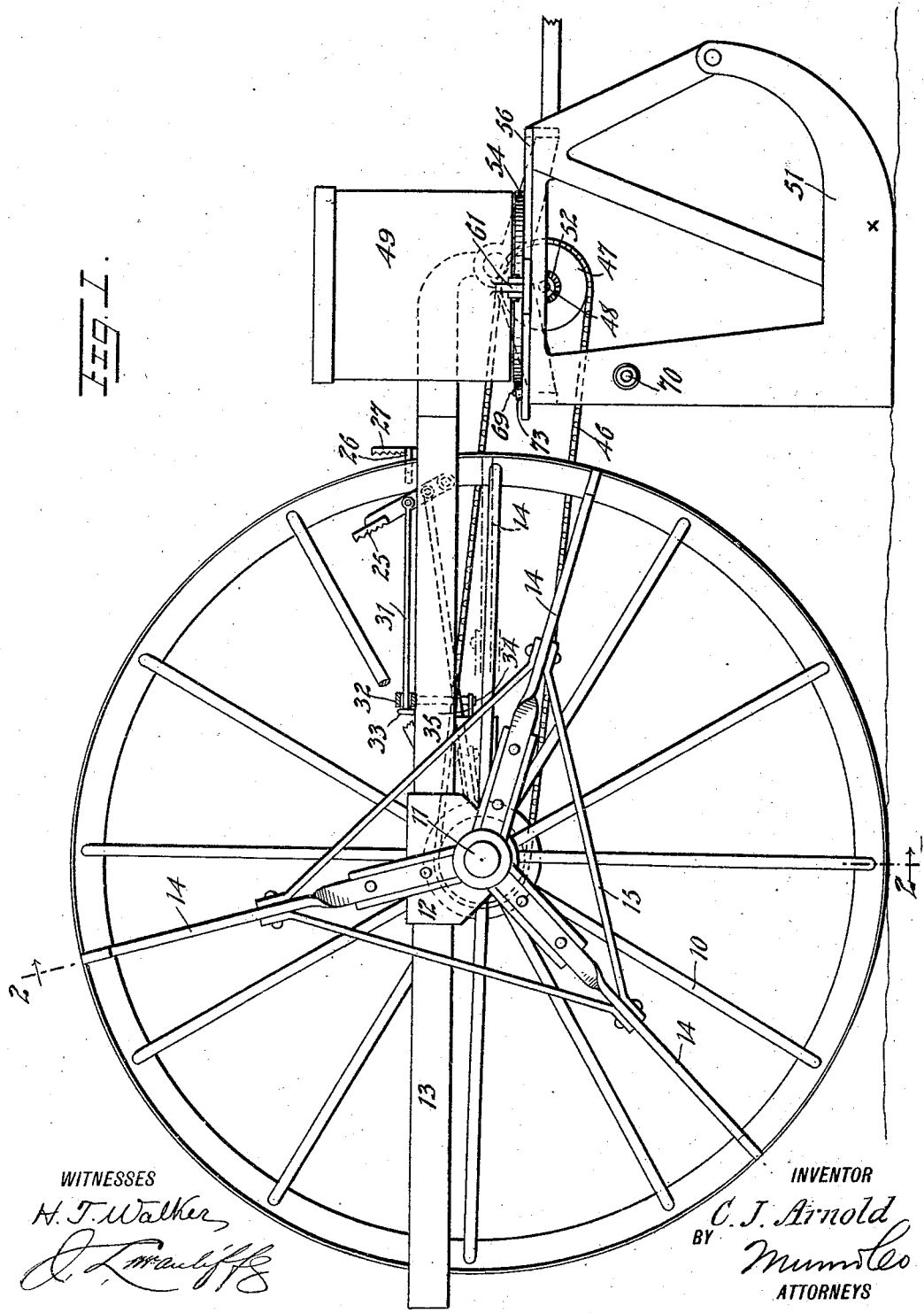

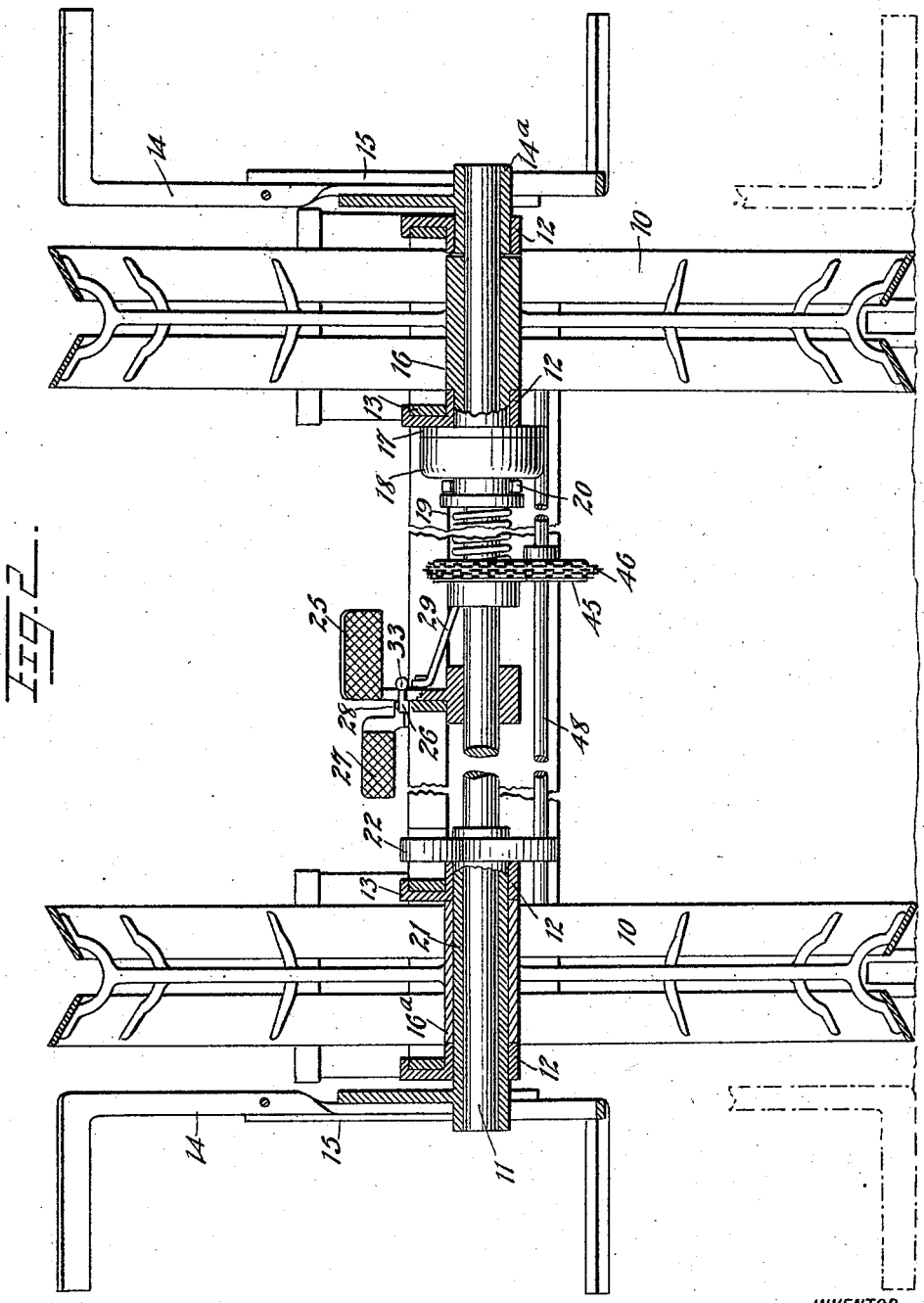

UNITED STATES PATENT OFFICE.

CHRISTIAN JACOB ARNOLD, OF WALKER, IOWA.

WIRELESS CORN PLANTER.

1,420,465.  Specification of Letters Patent.  Patented June 20, 1922.

Application filed October 3, 1919. Serial No. 328,105.

*To all whom it may concern:*

Be it known that I, CHRISTIAN J. ARNOLD, a citizen of the United States, and a resident of Walker, in the county of Linn and State of Iowa, have invented a new and Improved Wireless Corn Planter, of which the following is a description.

My invention relates to corn planters and particularly to a corn planter in which a wire as the means for actuating the seed dropping mechanism is done away with and a novel arrangement of markers is provided to be manually controlled and operative in unison with the seed dropping mechanism, the arrangement being such that the planting can be done in straight rows to permit of thorough cultivation and no special difficulty in planting is met with by reason of any obstruction such as a hay mound or the like in a corn field as the machine equipped with my improved mechanism can be steered around the obstruction, the manually operable control means of the marker and dropping means being optionally operative to throw the machine into or out of operation as desired and whereby also the planting can be performed with facility and dispatch.

The invention is characterized by means whereby to insure the alining of a new row with previous rows after the turning of the machine at the end of the row.

The distinctive features of the invention and the advantages of the illustrated structural embodiment thereof will more clearly appear as the description proceeds.

Reference is to be had to the accompanying drawings forming a part of this specification, it being understood that the drawings are merely illustrative of one example of the invention.

Figure 1 is a side elevation of a corn planter embodying my invention, known features of the corn planter not necessary for the illustration of the invention being omitted;

Figure 2 is a transverse vertical section taken at the axle, parts being broken out;

Figure 3 is a plan view, also broken away and in section to illustrate a detail of construction;

Figure 4 is a detail in longitudinal vertical section as indicated by the line 4—4, Figure 3;

Figure 5 is a partly sectional side elevation of a shoe and a seed box, the plane of the section being indicated by the lines 5—5 in Figures 3 and 6;

Figure 6 is a transverse vertical section on the line 6—6, Figure 5;

Figure 7 is a plan view of the dropper disk.

In carrying out my invention in accordance with the illustrated example, running wheels 10 are provided which are mounted loosely on an axle 11 which itself is mounted to turn in suitable bearings 12 on the frame 13 of the machine. Marker arms 14 in any desired number are fixed on the axle 11 outside of each of the wheels, three being employed in the illustrated example, disposed radially and equidistant from each other. The marker arms may be strengthened by braces 15.

The hub 16 of one wheel 10 has in rigid relation thereto, at the inner side of the wheel, a clutch element 17, and a coacting clutch element 18 slidable on the axle 11 is under the action of a coil spring 19 normally tending to throw the clutch into clutching position. A clutch fork 20 is adapted to throw out the clutch 18, said fork in the present example being in the form of a bellcrank lever manually operable as will appear. Within the hub 16ª of the other wheel 10 is a sleeve 21 fast on the axle 11 with which sleeve the adjacent marker 14 is rigid, said sleeve at the inside of the wheel 10 having rigid therewith a lock wheel 22 presenting three arms and adapted to be engaged by the roller 23 on the end of a spring pressed locking plunger 24 hereinafter further referred to. The main wheels have a circumference equal to the distance between three hills. The average distance between hills is about forty inches in planting corn. Also, the distance between the centers of the two wheel paths is also 40 inches so that the hills will be forty inches apart each way, it being understood that the machine may be adapted to any other distance between hills. With wheels of a perimeter of three times forty inches or one hundred and twenty inches and the three arms of the markers equidistanct apart, the marking will be done at intervals of forty inches and in the planting of a row and so long as the clutch 18 is in, the planting and marking will automatically proceed.

When the end of a row is reached the marking and dropping devices are thrown out and the hills of the next row are alined as follows: A pedal 25 is pivotally mounted on the frame 13 and is adapted to be held in position when the clutch is in engagement, by a latch 26 on a second pedal 27 that is acted upon by spring 28 normally tending to throw the latch into engagement with the pedal 25. The pedal 25 is connected by a link 29 with the clutch fork 20 for throwing out the clutch and the movement of the pedal to throw out the clutch at the same time withdraws a latch pin 30 from engagement with the plunger 24 permitting said plunger to move into the locking wheel 22. The pedal 25 is pressed forwardly to throw out the clutch 18 and throw in the lock plunger 24 as a marker 14 (see Figure 1) approaches the horizontal position at the front of the wheel as indicated in dotted lines and when the clutch is thrown in the arm 14 in the horizontal position at the front of the wheel will move downwardly to the perpendicular position to effect the marking action, the dropping mechanism as will appear being properly co-ordinated with the markers. For controlling the latch pin 30 of plunger 24 a rod 31 extends from the pedal 25 loosely through a lever 32 and has a head 33 at the rear end of said rod. The fulcrum pin 34 of lever 32 extends downwardly through the frame 13 and has at its lower end a crank arm or lever 35 pivotally connected with one end of pin 30. The pin has sliding movement in lugs 36 on a bracket 37 or other fixed part and a spring 38 on the pin abuts a collar 39 tending to throw the pin into a slot 40 in plunger 24. Said plunger has guided sliding movement in the bracket 37 and in a second bracket 41 and a spring 42 is coiled about the plunger, one end of the spring abutting against the bracket 41 and the other against a collar 43 to force the plunger forward when released by the latch pin 30. The throwing out of the clutch throws the drive of the markers and dropping mechanism out of action, as hereinafter further explained.

Referring to Figure 1 I would state that the distance from the perpendicular dropped from the center of the axle 11 to the place where the seed is dropped, that is to say, from the marker when in perpendicular position at the lower side of the wheel for marking, to the place where the seed is to be dropped, is the same as the distance from said perpendicular position around the circumference of the wheel at the front to the front marker 14 shown in full line position in Figure 1. Another inch is added to this to allow for the seed to drop to the ground so that the distance from said perpendicular position of the marker to the dropper tube (50, Figure 5) is in practice the same as the path through which the marker will move from the full line position at the right of Figure 1 downwardly to the perpendicular position plus one inch. The distance from the dotted line position of the marker arm at the right of Figure 1 downwardly to the perpendicular position is laid off on the ground line or from said perpendicular position of the marker to a point approximately at X in Figure 1 on the shoe 51, and at the end of a row the pedal 25 is operated to throw the clutch out and throw the lock plunger 24 in when that marker arm turning forwardly is approaching the horizontal. The plunger 24 moves the adjacent arm of the lock wheel 22, and the arms of said wheel are curved at the sides to cause the shaft 11 and the marker arms to be turned by said plunger until the markers are centered and the forward arms thereof are in the horizontal position, the plunger at this time reaching a recess 44 in wheel 22 radial to its center so that the lock plunger is dead-centered with respect to the lock wheel. When the point X of the shoe comes over the place where seed is to be dropped, the clutch is again thrown in to cause the marker to turn and the dropping mechanism to be operated. When the dropper tube comes to the point previously occupied by X, the marker will have turned from the horizontal position to the full line position of Figure 1 which corresponds with the tripping position of the dropping mechanism. The plunger 24 will then be automatically moved backward by wheel 22 until pin 30 is engaged in slot 40 to latch the plunger. In the locking position of plunger 24, pin 30 bears against the side surface of the plunger and remains in the release position. When the pedal 25 is released to permit the clutch spring to throw in the clutch 18 the rod 31 being capable of movement relatively to the lever 32, moves without affecting the latch pin. Then, when the plunger 24 is forced back by the wheel 22 revolving, the pin 30 will engage the plunger when the slot 40 comes opposite said pin.

The dropping mechanism is operated as follows: On the shaft 11 is a chain wheel 45 over which a chain 46 runs to a wheel 47 on the transverse dropper shaft 48, the ends of which extend beneath the seed boxes 49. At each end, shaft 48 has a pinion 42 meshing with a pinion 53 fast on the under side of the dropper disk 54 disposed beneath the bottom 55 of a seed box, said bottom having openings 55$^a$ for the escape of the seed. The dropper disk 54 is supported on a ring-like frame part 56 presenting an opening for the pinion 53 and the bolt 57 extends through the bottom 55 of the seed box provided with a wing nut 58 acting against a washer 59 and the pressure of the nut and washer is received against the lower end of a boss 60 on the seed box bottom 55, the arrangement being such that the dropper disk 54 is free to turn about said boss 60. When the bolt 57 is removed the seed box may be swung on a hinge 61, the box being held in the operative position by a clamp bolt 62 having a wing nut 63, said bolt being swingable on the frame part 56 and engageable with lugs on the seed box or vice versa, the bolt in the illustrated example being pivoted on the frame part 56 and adapted to swing between two lugs 54 on the seed box.

The dropper disk 54 has properly positioned outlet holes 65 for the seed which are adapted to be brought into register with a hole 66 in frame part 56 in register with the dropper tube 50, so that the seed may drop to a reciprocating valve plate 67 mounted in the shoe 51 beneath the tube 50 and formed with a hole 68 brought into and out of register with the dropper tube 50, so that the seed may drop by the action of a lever 69 disposed vertically in the shoe at the back of the tube 50 and fulcrumed between its ends as at 70.

A retractile spring 71 tends to rock the lever 69 for moving plate 67 to bring the holes 68 into register with the dropper tube. At the upper end the lever 69 has clearance in a lateral slot 72 in frame part 56 and on said lever is a roller 73 which is maintained by the action of spring 71 in engagement with the periphery of the dropper disk 54. Said dropper disk at the periphery has notches 74 at intervals therein to permit of the spring 71 throwing the lever to shift the valve slide 67. At one side each recess 74 is disposed radially to permit a quick inward movement of roller 73 for the quick action of plate 67 while at the opposite side of said recess, the same is sloping to throw out the roller 73 and lock the lever 69.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A corn planter including an axle, running wheels loose thereon, markers fast on said axle, a manually controlled clutch to establish or disestablish a drive connection between one of the wheels and the axle, lock means to hold the axle against turning, and operating means common to both the clutch and lock means to simultaneously throw out the clutch and throw in the lock means.

2. A corn planter including an axle, a sleeve keyed on the axle, wheels on said axle one of said wheels being loose on said sleeve, coacting clutch elements on the wheel and sleeve, a marker fast on said sleeve, a running wheel loose on the axle at the opposite end, a marker fast on the axle adjacent to the second wheel at the outside of the latter, a lock wheel fast on the axle adjacent to second wheel, manually controlled means to throw out the clutch, and means operable by said manually controlled means to simultaneously engage said lock wheel with the throwing out of the clutch.

3. A corn planter including an axle, running wheels loose on the axle, markers mounted to turn with the turning of the axle, a manually controlled clutch to establish or disestablish drive connection between one of the wheels and the axle, spring means tending to hold the clutch in action, and manually controlled means to throw out the clutch; together with lock means to prevent turning of the axle, and means operative by said manually controlled means to bring said lock means into action with the throwing out of the clutch.

4. A corn planter including an axle, running wheels loose thereon, markers fast on said axle, a manually controlled clutch to establish or disestablish a drive connection between one of the wheels and the axle, a lock wheel fast on said axle, a spring-pressed lock plunger normally tending to engage said lock wheel to prevent turning of the axle, a latch pin to restrain said plunger in the release position, manually controlled means to throw said clutch out of action, and means to withdraw said latch pin and release the plunger with the throwing out of the clutch.

5. A corn planter including an axle, running wheels loose thereon, markers fast on said axle, a manually controlled clutch to establish or disestablish a drive connection between one of the wheels and the axle, a lock wheel fast on said axle, a spring-pressed lock plunger normally tending to engage said lock wheel to prevent turning of the axle, said lock wheel presenting arms engageable by the plunger to lock the axle, said arms being adapted to throw the plunger to the release position when the clutch is thrown in, a latch pin to restrain said plunger in the release position, and means to simultaneously throw out the clutch and to withdraw said latch pin in engagement with the plunger.

6. A corn planter including an axle, running wheels loose thereon, markers fast on said axle, a manually controlled clutch to establish or disestablish a drive connection between one of the wheels and the axle, a lock wheel fast on said axis, a spring-pressed lock plunger normally tending to engage said lock wheel to prevent turning of the axle, said lock wheel presenting arms engageable by the plunger to lock the axle, said arms being adapted to throw the plunger to the release position when the clutch is thrown in, a latch pin to restrain said plunger in the release position, manually controlled means to throw out said clutch, and means to withdraw said latch pin with the throwing out of the clutch, said last-mentioned means when the clutch is thrown in being adapted to move relatively to the latch pin and without affecting the latter, said latch pin being adapted to automatically engage the plunger when the latter reaches the release position.

7. A corn planter including an axle, running wheels loose on the axle, markers mounted to turn with the turning of the axle, a manually controlled clutch to establish or disestablish drive connection between one of the wheels and the axle, and means to center the markers and lock them against turning by the throwing out of the clutch.

CHRISTIAN JACOB ARNOLD.